United States Patent [19]

Komatsu

[11] Patent Number: 4,862,301
[45] Date of Patent: Aug. 29, 1989

[54] DOUBLE CASSETTE TAPE PLAYER

[75] Inventor: Norimasa Komatsu, Kakuda, Japan

[73] Assignee: Alps Electric Co., Ltd., Japan

[21] Appl. No.: 111,554

[22] Filed: Oct. 20, 1987

[30] Foreign Application Priority Data

Feb. 9, 1987 [JP] Japan .................. 62-18520[U]

[51] Int. Cl.⁴ .............................................. G11B 15/68
[52] U.S. Cl. ....................................... 360/92; 360/105
[58] Field of Search ............... 360/92, 91, 69, 105; 242/189, 200

[56] References Cited

U.S. PATENT DOCUMENTS

| | | | |
|---|---|---|---|
| 3,560,666 | 2/1971 | Bookman | 360/92 X |
| 4,114,834 | 9/1978 | Haake | 242/200 |
| 4,222,083 | 9/1980 | Tronzano et al. | 360/92 |
| 4,768,112 | 8/1988 | Kido | 360/69 |

FOREIGN PATENT DOCUMENTS 2802255 8/1978 Fed. Rep. of Germany ........ 360/92

Primary Examiner—John H. Wolff
Attorney, Agent, or Firm—Guy W. Shoup; Paul J. Winters; Stephen L. Malaska

[57] ABSTRACT

Disclosed is a double cassette tape player wherein a single magnetic head is used to perform the playback and recording operations for both cassette tapes. The cassette tapes are each mounted in a cassette mounting section and the magnetic head is mounted on a head base which is slidably mounted on a sliding member disposed on the chassis. A drive mechanism is provided to move the head base in reciprocating fashion on the sliding member such that the magnetic head can move from one cassette tape to the other, thereby eliminating the need for a magnetic head for each cassette tape.

5 Claims, 5 Drawing Sheets

DOUBLE CASSETTE TAPE PLAYER

BACKGROUND OF THE INVENTION

The present invention relates to a double cassette tape player for use with a telephone set in which a pair of tape cassettes are alternately operated.

In general, in a tape player of a double cassette type used in a telephone set, the tape cassettes are alternately driven. This is because, for example, one of the tape cassettes is used to record outgoing messages to be sent, whereas the other one of the tape cassettes is utilized to record incoming messages from communicating partners and to playback the recorded messages later.

FIG. 7 is a schematic diagram showing a driving unit of such a conventional double cassette tape player for use with a telephone set.

The system of FIG. 7 includes micro-sized cassette halves Ca and Cb. These two cassettes Ca-Cb are mounted on reel plates Ra and Rb in two cassette mounting sections, respectively on a chassis 1a. In the cassette mounting section, there are further respectively disposed capstans Ka-Kb and pinch rollers Pa-Pb. The respective cassette mounting sections include separate magnetic heads Ha and Hb.

When the double cassette tape player of this kind is used in a telephone set to send and receive messages while the user of the telephone set is absent, the cassette mounting sections are not driven at the same time, namely, each cassette mounting section is driven alternately. Furthermore, in general, only one amplifier circuit is provided. As a consequence, in order to balance the tone volume of the playback sound of each tape cassette thus mounted, two magnetic heads Ha and Hb must be selected so that the difference of the characteristics are minimized between the magnetic heads Ha and Hb.

Consequently, the operation to select the magnetic heads becomes complicated, which leads to a disadvantage that the assembly and adjustment thereof are attended with difficulties. Moreover, since two magnetic heads are disposed in the driving unit of a tape player, the number of parts becomes greater and hence the production cost will be increased.

SUMMARY OF THE INVENTION

It is therefore an object of the present invention to provide a double cassette tape player to solve the conventional problems. According to the present invention, there is provided a magnetic head which is in use moved to alternately face the two cassette mounting sections so as to reduce the number of magnetic heads. Furthermore no characteristic differences between cassette mounting sections exist, such as the different sound volume when reproduced through a single amplifier, thus eliminating the need for selection of similarly characteristic heads.

According to the present invention, there is provided a double cassette tape player in which two sets of cassette mounting sections respectively including reel plates and capstans, are arranged on a chassis in a side-by-side fashion. And so when tape cassettes are installed thereon, tape exposure sections of the tape cassettes face to the same direction. Moreover, on the chassis, there is provided a sliding member extending over the cassette mounting sections and a head base on which a magnetic head is mounted and which is mounted on the sliding member so as to be moved between positions where the head base faces to the tape exposure sections of the tape cassettes, respectively. There is further included a driving mechanism to move the head base in a reciprocal fashion on the sliding member and a driving mechanism to move the sliding member along the chassis such that the magnetic head disposed on the head base on the sliding member is moved in a direction which approaches or moves away from the tape exposure section of either one of the tape cassettes.

In the double cassette tape player, by moving the head base disposed on the sliding member, the magnetic head mounted on the head base can be caused to face to the tape exposure section of either one of the tape cassettes. Furthermore, in this situation, when the sliding member is moved in a direction toward the cassette mounting section, the hehad base on the sliding member moves in a direction toward the cassette mounting section so as to enable the magnetic head to be brought into contact with a magnetic tape contained in one of the tape cassettes, thereby effecting a playback or a recording operation. Similarly, when the head base is moved to a direction of the other tape cassette, the playback or recording operation can be achieved by use of the tape cassette.

BRIEF DESCRIPTION OF THE DRAWINGS

The present invention will be apparent from the following detailed description taken in conjunction with the accompanying drawings in which.

DESCRIPTION OF THE PREFERRED EMBODIMENT

Figure 1:
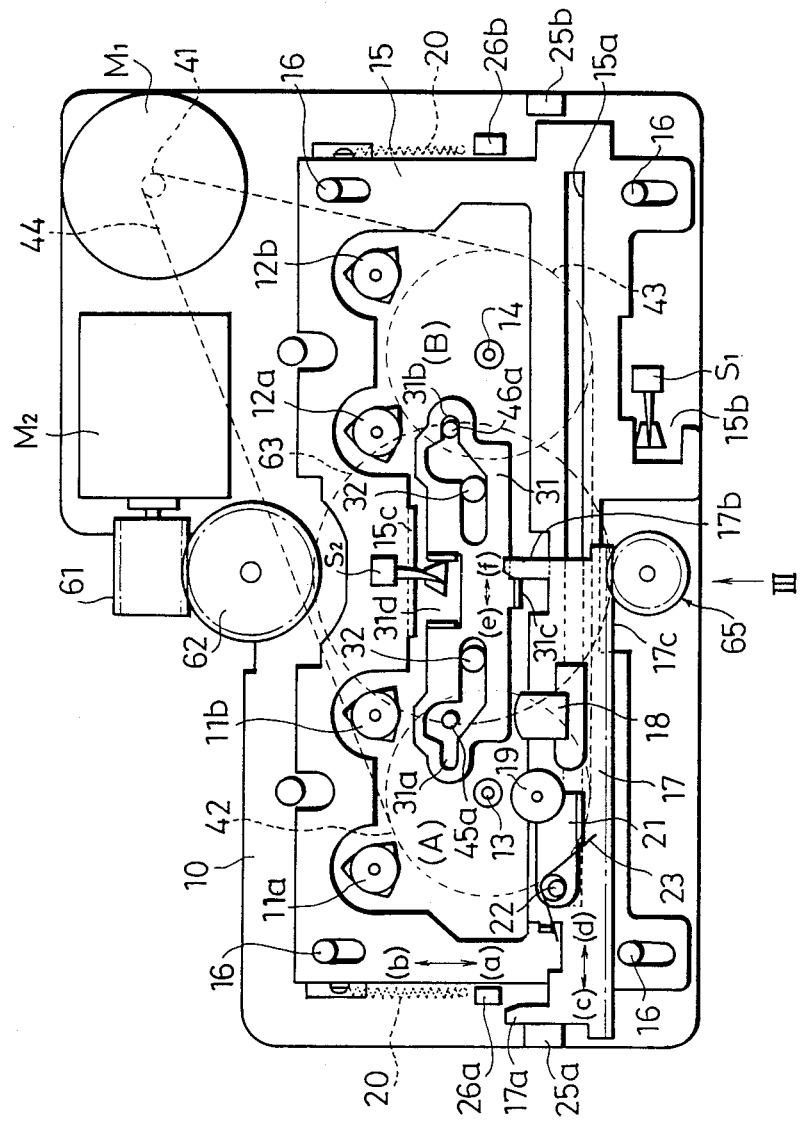
FIG. 1 is a plan view of a driving unit of a double cassette tape player as an embodiment according to the present invention.

Referring now to the drawings of FIGS. 1-6, an embodiment of the present invention will be described.

Figure 2:
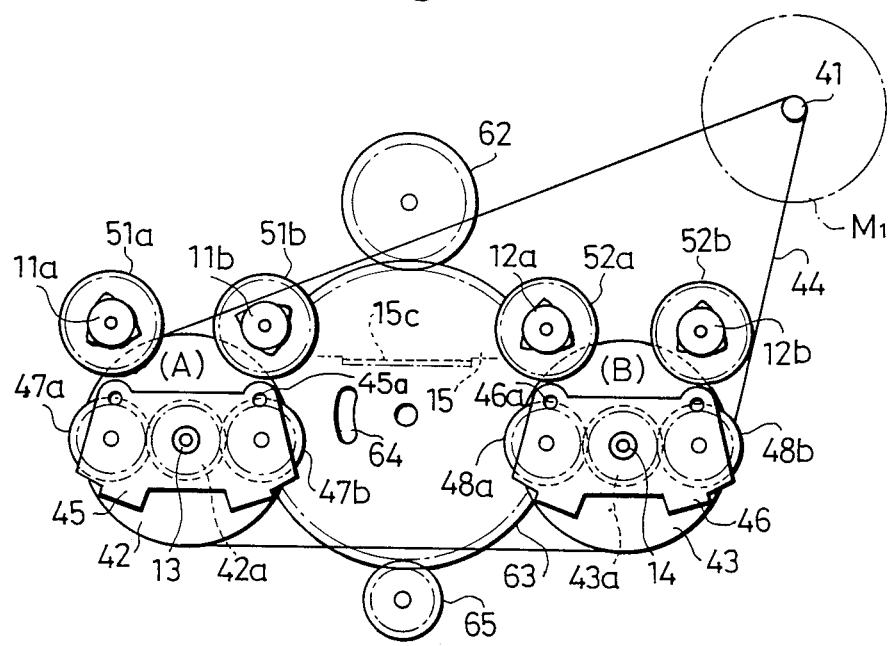
FIG. 2 is a plan view of a driving force transferring section disposed on a rear side of a chassis in the driving unit of FIG. 1 viewed through the chassis.
Figure 3:
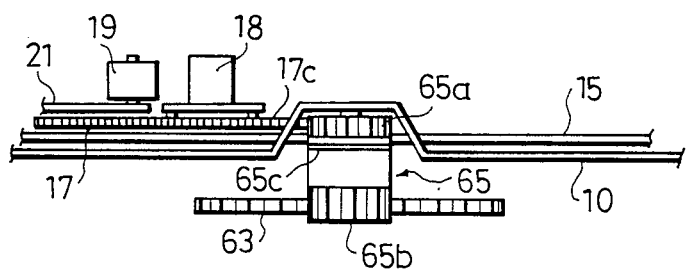
FIG. 3 is a cross-sectional view of the driving force transferring section along a direction marked by III in FIG. 1.

FIG. 1 is a plan view of a driving unit of the double cassette tape player according to the present invention viewed from a front side of a chassis thereof, FIG. 2 is a plan view of a driving force transferring section disposed on a rear side of the chassis viewed through the chassis, an FIG. 3 is a perspective view of a portion of the driving unit viewed in a direction marked by III in FIG. 1.

In the embodiment of the drawings, the cassette half to be mounted is of a micro size. However, the present invention is applicable to a case where a cassette half of a normal size is mounted therein.

Figure 4:
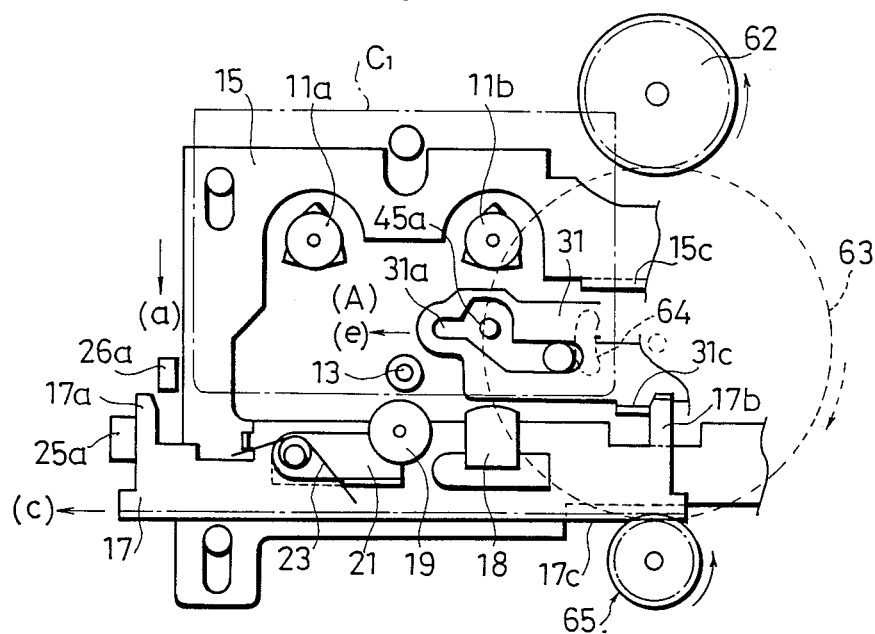
FIGS. 4-5 are partial plan views showing positions of the head base for respective operations when the tape cassette on the left-hand side is driven.
Figure 5:
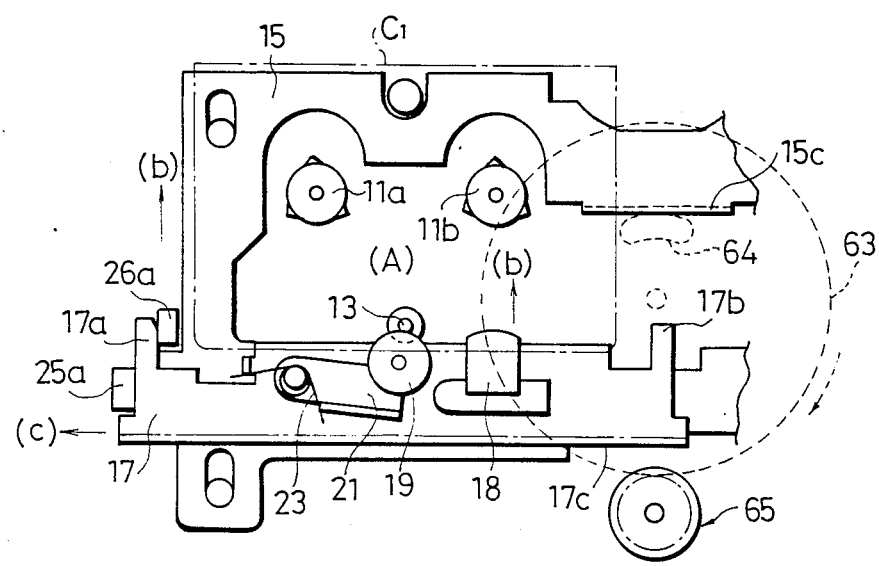
Figure 6:
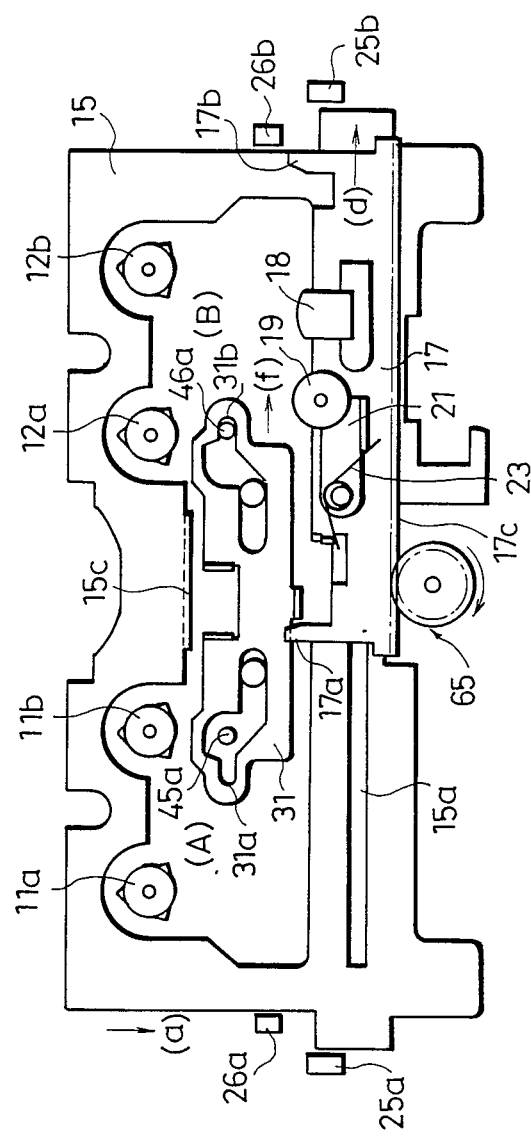
FIG. 6 is a plan view illustrating a state at an intermediate point when the head base is moved to the right-hand side.
Figure 7:
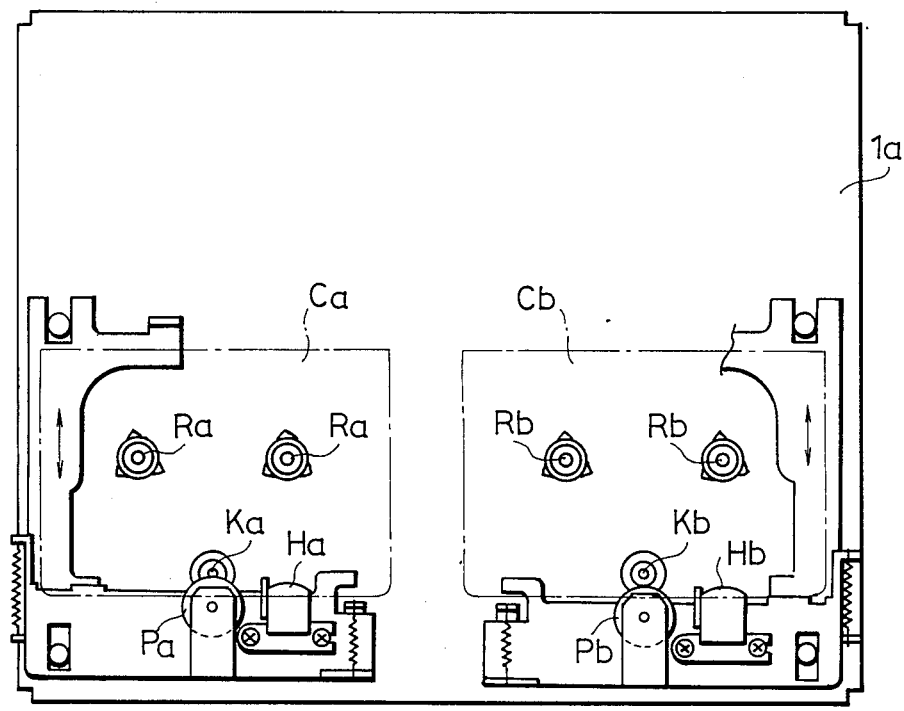
FIG. 7 is a plan view depicting the conventionl double cassette tape player.

Reference numeral 10 is a chassis in this configuration. On the chassis 10, there are disposed a cassette mounting section (A) and a cassette mounting section (B) at two locations on a right-hand side and on a left-hand side, respectively. In the cassette mounting section (A) on the left-hand side, there are arranged a pair of reel plates 11a and 11b and a capstan 13. In the cassette mounting section (B) on the right-hand side, there are arranged a pair of reel plates 12a and 12b and a capstan 14. As shown in FIGS. 4-5, a cassette half $C_1$ is installed in the cassette mounting section (A) on the left-hand side, whereas another cassette half $C_2$ is installed in the cassette mounting section (B) on the right-hand side (not shown). These cassettes $C_1$ and $C_2$ are mounted in side-by-side fashion such that respective tape exposure sections thereof face a direction towards the bottom of FIG. 1.

On the chassis 10, there is disposed a sliding member 15, which has a length extending over the cassette mounting sections (A) and (B) and is supported by four guide pins 16 located at four positions so as to be slidable in a direction (a) - (b). Between the sliding member 15 and the chassis 10, there is disposed a spring 20, which presses the sliding member 15 in a direction to (a). Furthermore, the sliding member 15 is provided with a guide groove 15a extending in a direction (c)-(d) of the figure, whereas on the sliding member 15, there is disposed a head base 17 to be guided in the direction (a direction (c)-(d)) along the guide groove 15a in a reciprocating fashion. On the head base 17, there is mounted a pinch roller 19, which is retained by a roller holder 21. The roller holder 21 is rotatably supported by a supporting shaft 22 on the head base 17. The roller holder 21 is pressed counterclockwise by a spring 23.

On the left end of the head base 17, there is formed a guide projection 17a, whereas on the right end thereof, there is formed a guide projection 17b. Furthermore, a stopper 25a and a guide 26a are disposed on the left side of the chassis 10, whereas a stopper 25b and a guide 26b are disposed on the right end thereof. The stoppers 25a and 25b and the guides 26a and 26b each have a height that enables the stoppers 25a and 25b and the guides 26a and 26b to be brought into contact with the guide projections 17a and 17b.

A change-over lever 31 is disposed in a central portion of the chassis 10. The change-over lever 31 is located in a notch disposed in a central part of the sliding member 15. The change-over lever 31 is supported and is guided by guide pins 32 to be slidable in the direction (e)-(f). On the left end of the change-over lever 31, there is formed a restricting groove 31a, whereas on the right end thereof, there is formed a restricting groove 31b. At a center of the bottom edge portion of the change-over lever 31, there is projected a bent portion 31c projecting in a direction from the rear side to the front side of the figure. The bent portion 31c is extended so as to be linked with guide pieces 17a and 17b respectively diposed on the left and right ends of the head base 17.

Detecting switches $S_1$ and $S_2$ are arranged on the chassis 10. The detecting switch $S_1$ is located in a notch 15b formed in the sliding member 15 so as to detect whether the sliding member is positioned at (a) or (b). The detecting switch $S_2$ is located in a notch 31d formed in the change-over lever 31 so as to detect whether the change-over lever 31 is positiond at (e) or (f).

On the chassis 10, there are disposed a main motor $M_1$ and an assist motor $M_2$. The main motor $M_1$ is used to drive the capstans 13-14, whereas the assist motor $M_2$ is installed to drive the head base 17 and the sliding member 15. As shown in FIG. 2, the capstan 13 on the left side in the figure is formed integrally with a flywheel 42 disposed on the rear side of the chassis 10, whereas the capstan 14 on the right side thereof is formed integrally with a flywheel 43 disposed on the rear side of the chassis 10. Between each of the flywheels 42-43 and a pulley 41 arranged on the driving shaft of the main motor $M_1$, there is disposed a belt 44 such that depending on the forward or reverse rotation of the main motor $M_1$, the flywheels 42-43 and the capstans 13-14 are driven to rotate clockwise or counterclockwise, respectively.

As shown in FIG. 2, a driving gear 42a is formed integrally with the flywheel 42 on the left side of the figure, whereas a driving gear 43a is formed integrally with the flywheel 43 on the right side thereof. Furthermore, on the capstan 13 on the left side, an idle plate 45 is supported so as to rotate independently, whereas on the capstan 14 on the right side, an idle plate 46 is supported so as to rotate independently. On the idle plate 45 on the left side, there are supported a pair of idle gears 47a and 47b, which are permanently engaged with the driving gear 42a. Similarly, a pair of idle gears 48a and 48b are supported, which are permanently engaged with the driving gear 43a. In addition, the reel plates 11a and 11b arranged in pair on the left side are respectively integrated with the reel gears 51a and 51b, and the idle gears 47a and 47b are located at opposing positions where the idle gears 47a and 47b can be engagd with the reel gears 51a and 51b, respectively. Similarly, the real plates 12a and 12b arranged in pair on the right side are respectively integrated with the reel gears 52a and 52b, and the idle gears 48a and 48b are located at opposing positions where the idle gears 48a and 48b can be engaged with the reel gears 52a and 52b, respectively.

Moreover the idler plate 45 on the left side is provided with an idle pin 45a, whereas the idle plate 46 on the left side is provided with an idle pin 46a. The idle pins 45a and 46a are projected on the front side of the chassis 10. As shown in FIG. 1, the idle pin 45a is located at a position where the pin 45a is restricted by the restricting groove 31a of the change-over lever 31, whereas the idle pin 46a is located at a position where the pin 46a is restricted by the restricting groove 31b of the change-over lever 31.

In addition, a worm gear 61 is disposed on the driving shaft of the assist motor $M_2$ arranged in the chassis 10 and is engaged with a transfer gear 62. Furthermore, the transfer gear 62 is engaged with a change-over gear 63 disposed on the rear side of the chassis 10. As shown in FIG. 2, a driving cam 64 is integrally formed on the upper surface of the change-over gear 63. In a central portion of the sliding member 15, there is bent the sliding piece 15c, which is located at a position where the sliding piece 15c is pushed against the driving cam 64 when the change-over gear 63 is rotated. Namely, when the change-over gear 63 is rotated, the sliding member 15 is pushed in the direction (b) by means of the driving cam 64.

Moreover, the chassis 10 is provided with a gear 65 to drive the head base 17. As shown in FIG. 3, the head base driving gear 65 comprises an upper gear 65a and a lower gear 65b. Both gears 65a and 65b are pressed against each other via a felt piece to be able to slip on each other depending on loads imposed thereon. The lower gear 65b is engaged with the change-over gear 63, whereas the upper gear 65a is engaged with a lack 17c formed on a lower edge portion of the head base 17.

Next, the operation of the configuration will be described.

A pair of cassette halves $C_1$ and $C_2$ are installed in the respective cassette mounting sections (A) and (B) with the respective tape exposure portions facing to bottom edge of the figure. In FIGS. 4-5 of the embodiment, there is shown only a tape cassette $C_1$ installed in the cassette mounting section (A). The other cassette $C_2$ (not shown) is to be installed in the similar fashion in the casette mounting section (B).

When driving the cassette $C_1$ loaded in the cassette mounting section (A) on the left-hand side, the transfer gear 62 is counterclockwise rotated by the assist motor $M_2$. The change-over gear 63 engaged with the transfer gear 62 then rotates clockwise and the head base driving gear 65 engaged with the change-over gear 63 is rotated counterclockwise. As a result, the head base 17 having the lack 17c engaging with the upper gear 65a of the head base driving gear 65 is moved along the guide groove 15a of the sliding member 15 in the direction (c). This causes, as shown in FIG. 4, the magnetic head 18 and the pinch roller 19 on the head base 17 to face the tape exposure section of the cassette $C_1$. In this situation, the guide projection 17b formed on the right-hand side of the head base 17 pushes the bent piece 31c disposed on the change-over lever 31 toward the left-hand side and hence the change-over lever 31 is driven in the direction (e). The restricting groove 31b on the right-hand side of the change-over lever 31 restricts the idle pin 46a on the side of the cassette mounting section (B) so as to prevent the rotating motion of the idle plate 46 on the right-hand side. In contrast, the idle pin 45 on the side of the cassette mounting section (A) is not subjected to the restriction of the restricting groove 31a of the change-over lever 31 and the idle plate 45 on the right-hand side is therefore rotatable.

When the head base 17 is moved to the side (c), the left edge portion of the guide projection 17a is brought into contact with the stopper 25a, and as a result, the head base 17 stops at this position. The assist motor $M_2$ continues rotating after the head base 17 is stopped. This causes the change-over gear 63 to continue rotating clockwise and the lower gear 65b of the head base driving gear 65 to be continuously driven by the change-over gear 63. However, since the head base 17 engaged with the upper gear 65a is brought into contact with the stopper 25a and is in a state that the head base 17 can no longer move in the direction (c), the upper gear 65a does not turn and hence the upper gear 65a and the gear 65b slip on each other via the felt piece 65c. During the slippage, the change-over gear 63 continues rotating clockwise also after the head base 17 is brought into contact with the stopper 25a, which enables the driving cam 64 on the change-over gear 63 to strike against the driving piece 15c of the sliding member 15. As shown in FIG. 5, the sliding member 15 is moved by the driving cam 64 in the direction (b) against the force imparted from the spring 20. Consequently, as the guide projection 17a moves between the stopper 25a and the guide 26a, the head base 17 on the sliding member 15 is also moved in the direction (b). As a result, the magnetic head 18 on the head base 17 is brought into contact with a tape in the tape cassette $C_1$ and the tape is pressed against the capstan 13 by means of the pinch roller 19.

In this situation, when the flywheel 42 on the left-hand side is driven clockwise by the main motor $M_1$, the rotary motion of the flywheel 42 causes the idle plate 45 to move clockwise and the gear 47a located on the left side of the pair of the idle gears 47a–47b is engaged with the reel gear 51a. The driving force of the flywheel 42 is therefore imparted via the driving gear 42a and the idle gear 47a to the reel gear 51a so as to turn the reel plate 11a clockwise. The magnetic tape in the tape cassette $C_1$ is sandwiched by the capstan 13 rotating clockwise and the pinch roller 19 so as to be fed to the left and to be rolled up by the reel plate 11a, thereby effecting the playback or recording operation through the magnetic head 18.

Furthermore, as shown in FIG. 4, when the sliding member 15 is retracted in the direction (a) and hence the head base 17 is located at a position apart from the tape cassette $C_1$, if the flywheel 42 is clockwise turned at a high rotary speed by means of the main motor $M_1$, the reel plate 11a is rotated clockwise by the idle gear 47a so as to achieve a fast feed operation to feed the tape at a high speed. Contrarily, if the main motor $M_1$ is reversely turned, the flywheel turns counterclockwise, the idle plate 45 rotates counterclockwise, the idle gear 47b is engaged with the reel gear 51b, and the reel plate 11b is driven counterclockwie so as to rewind the magnetic tape.

While the playback, recording, fast feed, or rewind operation is taking place on the tape cassette $C_1$ in the cassette mounting section (A) as described above, the idle pin 46a in the cassette mounting section (B) on the right-hand side is restricted by the restricting groove 31b of the change-over lever 31 so as not to allow the rotary motion of the idle plate 46. As a result, even if the flywheel 43 on the right-hand side is driven clockwise or counterclockwise by the driving force of the main motor $M_1$, the idle gears 48a–48b remain separated from the reel gears 52a–52b, namely, the driving force is not imparted to the reel gears 52a and 52b. In addition, when the head base 17 is further moved to the right, the head base 17 retracts in the direction (a). The guide projection 17b of the head base 17 is therefore separated from the bent piece 31c of the change-over lever 31, and the change-over lever 31 is retained at a position near the side (e). Consequently, the idle pin 46a on the right-hand side is kept restricted by the restricting groove 31b of the change-over lever 31. That is, when the fast feed or rewind operation is being performed in cassette mounting section (A), the reel gears 52a ånd 52b of the cassette mounting section (B) will not be engaged or driven, even if head base 17 is moved to the right with respect to position (e).

Next, in a case where the cassette $C_2$ (not shown) loaded in the cassette mounting section (B) on the right-hand side is to be driven, the assist motor $M_2$ is reversely rotated so as to rotate the change-over gear 63 counterclockwise via the transfer gear 62. This causes the head base driving gear 65 to be driven clockwise, and the head base 17 is moved in the direction (d) by the upper gear 65a of the head base driving gear 65. When the head base 17 is moved to the position of FIG. 6, the guide projection 17a on the left side of the head base 17 is linked with the bent piece 31c of the change-over lever 31. That is, when the head base 17 is further moved to the right (the direction (d)) therefrom, the change-over lever 31 is moved to the direction (f) by the guide projection 17a. The idle plate 45 of the cassette mounting section (A) on the left-hand side is then restricted by the restricting groove 31a on the left end of the changeover lever 31 and the idle plate 46 of the cassette mounting section (B) on the right-hand side is set to a free state. Like the operations of the cassette mounting section (A), after the right edge of the head base 17 is brought into contact with the stopper 25b on the right-hand side, the sliding member 15 is moved up in the direction (b) by the driving force of the assist motor $M_2$ and the head base 17 moved in the direction toward the tape cassette $C_2$, thereby enabling the playback or recording operation.

Although the pinch roller 19 is arranged on the head base 17 in this embodiment, it may also be possible to dispose two pinch rollers in the cassette mounting sections (A) and (B), respectively such that when the head base 17 is moved to the direction (b), either one of the pinch rollers is pressed by the head base 17 so as to be moved to the direction toward the capstan 13.

Furthermore, in this embodiment, the cassette half is of a micro size; however, the configuration of the present invention is also applicable to a case where a cassette half is of the normal size. In this case, only the locations where the magnetic head and the capstant are arranged are changed.

According to the present invention, a magnetic head is alternately used for two cassette mounting sections and hence in an instrument, for example, in a telephone set used to send and receive messages while the user of the telephone set is absent in which only an amplifier is mounted, the difference in the playback sound volume or the like between the cassette mounting sections can be avoided. Furthermore, since the number of magnetic heads can be reduced, the cost of the tape player may also be lowered. In addition, the operation effected for the conventional apparatus to select the two magnetic heads depending on the characteristics thereof is unnecessitated and therefore the assembly operation is facilitated.

Moreover, as shown in the embodiment, if the pinch roller is mounted on the head base, the number of pinch rollers can also be minimized to one. Namely, in this case, only one pinch roller is required.

While the present invention has been described with reference to the particular illustrative embodiment, it is not restricted by the embodiment but by the appended claims. It is to be appreciated that those skilled in the art can change and modify the embodiment without departing from the scope and spirit of the invention.

What is claimed is:

1. A double cassette tape playing and/or recording apparatus for use with magnetic cassette tapes of the type having a housing, and a magnetic tape wound around a pair of reels within said housing, said apparatus comprising:
   a chassis;
   a pair of cassette mounting sections arranged on said chassis, each for receiving such a cassette tape, and each of said cassette mounting sections having a reel plate and a capstan;
   a sliding member disposed on said chassis so as to extend over both of said cassette mounting sections;
   a head base slidably mounted on said sliding member;
   a magnetic head mounted to said head base;
   means for reciprocally moving said head base on said sliding member so that said magnetic head moves from one of said cassette mounting sections to the other of said cassette mounting sections;
   means for moving said sliding member along said chassis so that said magnetic head is moved to contact such a magnetic tape for playing and/or recording.

2. A double cassette tape playing and/or recording apparatus according to claim 1, wherein said cassette mounting sections are adapted to receive magnetic cassette tapes of a micro size.

3. A double cassette tape playing and/or recording apparatus according to claim 1, wherein said cassette mounting sections are adapted to receive magnetic cassette tapes of a standard size.

4. A double casette tape player according to claim 6 further including a pinch roller disposed on said head base.

5. A double cassette tape player according to claim 6 further including two pinch rollers disposed on said cassette mounting sections, respectively.

* * * * *

UNITED STATES PATENT AND TRADEMARK OFFICE
CERTIFICATE OF CORRECTION

PATENT NO. : 4,862,301

DATED : August 29, 1989

INVENTOR(S) : Norimasa Komatsu

It is certified that error appears in the above-identified patent and that said Letters Patent is hereby corrected as shown below:

Col. 8 Line 36, "claim 6" should read -- claim 1 --.

Col. 8 Line 39, "claim 6" should read -- claim 1 --.

Signed and Sealed this

Seventh Day of August, 1990

*Attest:*

HARRY F. MANBECK, JR.

*Attesting Officer*   Commissioner of Patents and Trademarks